United States Patent [19]

Phillips et al.

[11] Patent Number: 5,686,515
[45] Date of Patent: Nov. 11, 1997

[54] COLORED POLYETHYLENE TEREPHTHALATE COMPOSITION AND PROCESS OF ITS MANUFACTURE

[75] Inventors: Tracy L. Phillips, Lawrenceville; Ronald M. Harris, Alpharetta; Alan R. Burgess, Roswell; Judy A. Johnston, Oakwood, all of Ga.

[73] Assignee: The M.A. Hanna Company, Cleveland, Ohio

[21] Appl. No.: 557,685

[22] Filed: Nov. 13, 1995

[51] Int. Cl.$^6$ .................. C08K 5/09; C08J 3/20
[52] U.S. Cl. .............. 524/275; 524/271; 524/272; 524/487; 524/489; 524/502; 524/539; 524/580; 524/581; 524/583; 523/206; 523/351
[58] Field of Search .................. 524/487, 489, 524/275, 272, 271, 502, 539, 580, 581, 583; 523/206

[56] References Cited

U.S. PATENT DOCUMENTS

| | | | |
|---|---|---|---|
| 4,167,503 | 9/1979 | Cipriani | 524/297 |
| 4,394,470 | 7/1983 | Werner et al. | 524/732 |
| 4,640,690 | 2/1987 | Baumgartner et al. | 524/583 |
| 4,680,344 | 7/1987 | Coker | 525/64 |
| 4,782,111 | 11/1988 | Klein et al. | 524/539 |
| 4,810,733 | 3/1989 | Sakuma et al. | 524/231 |
| 4,988,477 | 1/1991 | Bes et al. | 264/537 |
| 5,157,067 | 10/1992 | Burditt et al. | 524/270 |
| 5,194,506 | 3/1993 | Efner et al. | 525/166 |
| 5,240,966 | 8/1993 | Iwasaki et al. | 521/143 |
| 5,262,471 | 11/1993 | Akao | 524/495 |
| 5,302,645 | 4/1994 | Nakano et al. | 524/513 |
| 5,326,516 | 7/1994 | Brannon | 524/388 |
| 5,382,465 | 1/1995 | Misawa et al. | 428/195 |

*Primary Examiner*—Paul R. Michl
*Assistant Examiner*—Olga Asinousky

[57] ABSTRACT

A process for manufacture of articles comprised of polyethylene terephthalate wherein the PET is colored with a composition comprised of a wax dispersant, ethylene copolymer, and a colorant. In a preferred embodiment, the wax dispersant is a maleated polyethylene wax. In an alternative embodiment, the wax dispersant is a low molecular weight polyethylene wax and the composition further includes linear low density polyethylene. A preferred ethylene copolymer is ethylene-(meth)acrylic acid.

22 Claims, No Drawings

COLORED POLYETHYLENE TEREPHTHALATE COMPOSITION AND PROCESS OF ITS MANUFACTURE

BACKGROUND OF THE INVENTION

1. Field of the Invention

This invention relates to polyethylene terephthalate. Particularly, the invention is directed to a method of manufacturing colored polyethylene terephthalate articles. The inventive process is particularly well suited to stretch blow molding of colored articles of polyethylene terephthalate. Throughout the specification, numerous references will be made to the use of the inventive process in coloring blow molded polyethylene terephthalate articles. However, it should be realized that the inventive process is applicable to many methods of manufacturing colored products of polyethylene terephthalate.

2. Description of the Art

Conventional concentrated colorant delivery systems for molded or extruded articles of thermoplastic resins include: colorants (pigments/dyes) and dispersants blended into a dry powder; colorants dispersed in liquid or paste; concentrated colorants encapsulated in resin pellets; and colorants encapsulated in wax based dispersants.

When developing a product to color thermoplastic resins, the skilled artisan will consider the handling, storage, incorporation and dispersion characteristics of the delivery system. Each of the above described colorant systems provide advantageous characteristics. However, each colorant system also demonstrates significant drawbacks. Particularly, handling and cleanliness of the work environment is a concern when powder colorant systems are utilized. The effect of the dispersant on the characteristics of the colored thermoplastic resin can be a concern in liquid and wax based systems. In developing the appropriate colorant system, polyethylene terephthalate has proved especially troublesome to color.

Polyethylene terephthalate (PET) has been used widely in various industrial fields as an engineering plastic because of it's excellent mechanical properties. In particular, polyethylene terephthalate is being frequently utilized to replace polyvinylchlorides in a number of food and consumer goods packaging applications. However, polyethylene terephthalate has proved to be an especially difficult composition to color. For example, a very small quantity of water can cause hydrolytic degradation of the polymer during processing whereby mechanical and physical properties of the product may be compromised significantly. Particularly, water reacts undesirably with PET to produce ethanol and terephthalic acid. For this reason, the traditional method of coloring polyethylene terephthalate has been the use of colored pigments concentrated in a pellet of PET.

U.S. Pat. No. 4,782,111 describes a process of coloring polyethylene terephthalate articles wherein chips of colorant are utilized. The chips are comprised, for example, of a mixture of ground polyethylene terephthalate, coisophthalate comixed with polybutylene terephthalate and a dye.

In a typical manufacturing process, the colored concentrate pellets are then blended with a natural resin and dried to the appropriate dewpoint prior to injection molding. Obviously, this drying stage is extraordinarily inconvenient to the manufacturer. Similarly, if a color adjustment has to be made during the molding process, the entire blend, typically several thousand pounds, has to be removed from the production line, adjusted for color, and then redried. In addition, it is often desirable to recrystallize the concentrate pellets prior to use to regain molecular weight, allowing the pellets to flow freely in the feed throat (uncrystallized pellets can get sticky at PET drying temperature). Obviously, color suppliers incur additional costs in their manufacturing process to achieve the recrystallization. Accordingly, colorant pellets based on PET are problematic to work with.

Although difficulties are encountered with PET based colorant pellets as a result of the tendency for hydrolysis in PET, the high strength characteristic of PET, which makes it desirable, can be negatively influenced by alternative colorant delivery systems. Particularly, two distinct steps are utilized in stretch blow molding of PET: (1) formation of a preform by injection molding and (2) conditioning of the preform by heating above the glass transition point and blowing to a final shape with pressurized air. During the blow molding stage, the preform is stretched along its longitudinal axis by a mechanical plunger while being blown outward. This bi-directional stretching yields bi-axial orientation of the PET molecular chain. The result is a several fold increase in strength over a part which is fabricated by blow molding without stretching. During the stretch-blow process, the wall thickness of the part may decrease by a factor ranging from two to five. It is noted that the larger the drawdown, the stronger the resultant part due to orientation of the polymeric chains. Clearly, it is imperative that the colorant delivery system not interfere with the polymeric crystallization and orientation. For these reasons, the industry has frequently struggled with the development of a highly desirable colorant system for PET.

In fact, although several colorant systems exist for coloring of more stable thermoplastic resins with a resin pellet not founded on the base material, this procedure has been avoided in PET. For example, U.S. Pat. No. 5,326,516, herein incorporated by reference, describes a thermoplastic resin based colorant comprised of a thermoplastic polymer having a refractive index which is within about 0.06 units of the refractive index of a thermosetting resin. However, this patent does not indicate the colorants to be appropriate for use in polyester terephthalate.

Similarly, M. A. Hanna Color Company, a business unit of The M. A. Hanna Company, has previously utilized resin based colorant systems comprised of blends of a copolymer of polyethylene and a high polymer, waxes, and sometimes polyethylene to color polyethylene, polypropylene, polystyrene, acrylonitrile-butadiene-styrene, olefin-styrene block copolymers and polycarbonate. However, due to the unique problems presented by polyethylene terephthalate, a non-PET resin based pellet colorant is not believed to have heretofore been used in a polyethylene terephthalate coloring process.

An alternative system for coloring PET articles is typically referred to as a "liquid system". U.S. Pat. No. 4,167,503 for example, herein incorporated by reference, describes a liquid carrier system for dispersing organic and inorganic colorants. The system consists of a dye dispersed in a liquid vehicle of ethoxylated alkyphenols, a nonionic surfactant, a plasticizer, and an antioxidant. An improved liquid colorant system is described in U.S. Pat. No. 5,157,067, herein incorporated by reference, wherein the liquid concentrate is comprised of a vehicle of inorganic rosin material, a surfactant, and at least one colorant.

Since liquid colorants for PET do not require drying, they are more economical to use than the above described pigment in a PET pellet method. Nonetheless, liquid colorants are wasteful because the colorant delivery vessels are never completely emptied. Furthermore, preferred delivery of the colored concentrate formulations by a pumping system to the feed throat of a molding machine often causes an injection molding screw to slip and cycle time to be extended. In addition, the liquid based carrier system can act as a plasticizer, reducing the strength of a blow molded article.

An unusual colorant system for PET is described in U.S. Pat. No. 4,394,470, which provides a system for coloring PET based on caramel. The patent is interesting for its description of the problems associated with coloring PET. For example, processing temperatures of 260° or 300° C. are required with PET and the colorant must therefore be able to withstand these temperatures. Moreover, decomposition of a colorant in a substantially transparent polyethylene terephthalate bottle, cup, box, tray, etc. for packaging foodstuff, is undesirable. Furthermore, as PET becomes more used in food packaging, the effect of the colorant on taste of the food product must be considered. Unfortunately, this carmel system is very limited in the colors which can be provided.

An alternative method of coloring PET is a system based on wax containing a color concentrate. U.S. Pat. No. 4,810,733, for example, herein incorporated by reference, describes a color concentrate comprised of one or more of polypropylene resins and polypropylene copolymers having a melt flow rate in the range of 0.1 to 100, one or more organic or inorganic pigments, and at least 10 to 50 percent, preferably 30 percent, by weight of a pigment dispersant selected from the group consisting of polyethylene wax, polypropylene wax, and derivatives thereof. Similarly, U.S. Pat. No. 4,988,477, herein incorporated by reference, discloses a particulate dye composition comprised of an intimate mixture of pigment and a wax-like carrier having a melting point above 45° C. Difficulties with the wax systems result from the tendency of the wax to melt prematurely and plug up a molding machine throat. In fact, historically, these types of drawbacks are typical when a processor is forced to use a colorant system based on an unfamiliar material i.e., non-resin based.

Accordingly, it is desirable in this art to have a colorant system for polyethylene terephthalate which is easily handled by PET molding operators.

SUMMARY OF THE INVENTION

It is a primary object of this invention to provide a new and improved process for coloring polyethylene terephthalate.

It is an advantage of the present invention to provide a PET colorant system based on easily handled thermoplastic resin pellets.

It is an additional advantage of this invention to provide a PET coloring process which does not require a drying or recrystallization step.

It is a particular advantage of this invention to be able to impart opaque colors to PET bottles, a goal which is difficult to achieve with liquid colorant systems without causing screw slippage.

It is a further advantage of the inventive process to provide a method of manufacturing a polyethylene terephthalate article which maintains the PET's desirable physical properties.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and advantages, in accordance with the purpose of the invention, as embodied and broadly described herein, the inventive process for preparing colored polyethylene terephthalate molded articles comprises the incorporation of a colorant system comprised of a wax dispersant, an ethylene copolymer, and colorants. The colorant system can optionally contain linear low density polyethylene and a stabilizer.

Preferably, the colorant system is comprised of about 10 to about 30% by weight wax dispersant, about 10 to about 30% by weight ethylene copolymer, and about 1 to about 70% by weight colorant.

In a preferred embodiment, particularly suited to manufacture of articles intended to contact food, the process utilizes a colorant system comprised of about 10 to about 30% by weight of a polyolefin wax preferable polyethylene wax, about 10 to about 30% by weight ethylene copolymer, about 7 to about 15% linear low density polyethylene, up to about 0.3% stabilizer, about 1 to about 70% colorant, and about 0 to 50% filler.

In a further preferred embodiment, particularly suited to manufacturer of articles not intended to contact food, the process utilizes a colorant system comprised of about 10 to about 30% by weight maleated polyolefin wax, preferably polyethylene wax, about 10 to about 30% ethylene copolymer, up to about 0.3% by weight stabilizer, about 1 to about 70% by weight colorant, and about 0 to about 50% filler.

A particularly significant discovery of the present invention is that a pearl effect, i.e. iridescence, can be achieved in a PET article colored with the present colorant system. In fact, it has been found that the vehicle component of the colorant system provides the pearl effect in oriented sections of a polyethylene article. Accordingly, uncolored, pearled articles can be constructed utilizing the vehicle component of the present invention. This discovery is significant because historically, a pearl effect was achieved with the addition of mica or metallic flake for example, which are generally large surface area particles that create a rough surface on the interior of the blow molded articles. In contrast, the present invention achieves a pearl effect without the undesirable rough interior surface. The pearl effect is particularly apparent in uncolored articles and in medium to dark colors having low pigment loading, for example, brown, burgundy, amber, translucent green and carmel.

DETAILED DESCRIPTION OF THE INVENTION

Reference will now be made in detail to the present preferred embodiment of the invention. While the inventive process will be described in conjunction with a preferred procedure, it will be understood that it is not intended to limit the invention to that procedure. On the contrary, it is intended to cover all alternatives, modifications and equivalents as may be included within the spirit and scope of the invention defined by the appended claims.

Two particular preferred embodiments of the invention exist. A first embodiment of the inventive process, directed to manufacturer of PET articles for food applications, utilizes a colorant system comprised of a wax dispersant, ethylene copolymer, linear low density polyethylene, stabilizer, and colorant. In a preferred process the melt index of the linear low density polyethylene is between about 20 and about 150 gms/10 min, more preferably about 100 gms/10 min.

A second embodiment of the inventive process, directed to manufacture of non-food related PET articles, utilizes a colorant system comprised of a maleated wax dispersant, ethylene copolymer, stabilizer, and colorant.

Suitable wax dispersants for the PET food related application are polyolefin homopolymers, including polyethylene wax, polypropylene wax, and blends/copolymers and oxidized versions thereof. For non-food applications, maleated polyolefin waxes or oxidized or chemically modified low molecular weight polymers thereof are preferred. As will be understood by those skilled in the art, use of the maleated waxes alleviates the need for linear low density polyethylene.

The ethylene copolymer is preferably ethylene copolymer having a melt index of between about 0.7 and about 20 gms/10 mins. A particularly preferred polyethylene copolymer is an ethylene-(meth) acrylic acid (alternatively ethylene-methyl acrylate copolymer) and its related chemical constituents.

The optional stabilizer utilized in the present invention is preferably a phosphite/antioxidant blend. A suitable stabilizer is B-225 available from Ciba-Giegy.

Preferred ranges for the colorant system in food related applications are the following:
10 to 30% by weight wax dispersant, preferably about 13%;
10 to 30% by weight ethylene copolymer, preferably about 10%;
7 to 15% by weight LLDPE, preferably about 7%;
up to 0.3% by weight stabilizer, preferably about 0.25%; and
1 to 70% by weight colorant, preferably about 50 to 70%.

Preferred ranges in the non-food related applications are the following:
10 to 30% by weight maleated wax dispersant, preferably about 20%;
10 to 30% by weight ethylene copolymer, preferably about 10%;
up to 0.3% by weight stabilizer, preferably about 0.25%; and
1 to 70% by weight colorant, preferably about 50 to 70%.

As those skilled in the art will recognize, the colorant system of the present invention can also include a filler such as clay, mica, talc, calcium carbonate, barites, ceramic spheres, glass spheres, glass flakes, calcium silicate and the like. In addition, additives typically utilized in plastic processing, such as antioxidants, UV absorbers, biocides, plasticizers, etc. can be utilized in the present inventive process. When these additions are utilized, the above-described weight percents are considered to be based on the system absent these additives.

The present invention is suitable for incorporation of colorants including pigments and most dyes. It is envisioned that the typical pigments and dyes utilized historically and as developed in the future for thermoplastic resins can be employed. For example, inorganic pigments such as titanium oxide, iron oxide, aluminum oxide, magnesium oxide, zinc sulfide, cobalt, cadmium, ultramarine, and carbon black or dyes such as quinopthalone, perinone, anthraquinone, thioxanthene, thioindigo, xanthene and coumarin can be utilized. Organic pigments such as sulfium baryte, azo pigments, condensed azo pigments, phthalocyanine, quinacriadone, isoindolinone, anthraquinone, and perylene types can be utilized. Of course, these are provided for example only and are not intended to limit the invention.

The inventive process is particularly superior to prior art procedures because of its simplicity. Moreover, typical polyethylene terephthalate processing mechanisms can readily be converted to incorporate the inventive colorant carrier system. More particularly, the present method can be used to replace traditional pellet colorant processes. The colorant formulation thus offers economic advantages by virtue of the fact that it can be advantageously used in conventional mass coloring processes for polyethylene terephthalate without additional, auxiliary equipment. Of course, the inventive process is not limited to those processing mechanisms and those mechanisms are solely highlighted for descriptive purposes.

The present invention will now be explained in more detail to exemplify the simplicity provided to the colorant manufacturer and the significant advantages obtained via its use in a process for PET manufacturing.

The advantages of the coloring process according to the invention are particularly apparent when used in combination with a PET stretch blow molding operation. The invention will now be explained in more detail by reference to the examples hereinbelow, intended to demonstrate the invention, but not limit the scope thereof.

EXAMPLES 1-4

Dispersants, additives, colorants, and carrier components are mixed thoroughly using a high intensity blender. The dry blend is then introduced to a counter-rotating twin screw extruder where the blend is melted according to the following temperature profile (100, 155, 155, 160, 160, 160° C.), dispersed, extruded, cooled, and pelletized.

The particular constituents of various colorant systems are portrayed in Table I.

TABLE I

| Sample | Ingredient | Amount |
|---|---|---|
| 1 | Pigment White 6 | 62.91% |
|   | Pigment Red 101 | 0.12% |
|   | Pigment Yellow 180 | 0.42% |
|   | PE Wax (powder) | 13.00% |
|   | 20 MI EMAC pellets (PE Copolymer) | 10.00% |
|   | 20-100 MI LLDPE powder | 8.30% |
|   | B-225 stabilizer blend (Ciba) | 0.25% |
|   | Calcium Carbonate | 5.00% |
| 2 | Pigment White 6 | 62.91% |
|   | Pigment Red 101 | 0.12% |
|   | Pigment Yellow 180 | 0.42% |
|   | Maleated PE Wax (powder) | 20.28% |
|   | 20 MI EMAC pellets (PE Copolymer) | 11.00% |
|   | B-225 stabilizer blend (Ciba) | 0.25% |
|   | Calcium Carbonate | 5.00% |
| 3 | Pigment White 6 | 62.91% |
|   | Pigment Red 101 | 0.12% |
|   | Pigment Yellow 180 | 0.42% |
|   | PE Wax (powder) | 15.00% |
|   | 20 MI EMAC pellets (PE Copolymer) | 13.00% |
|   | 20-100 MI LLDPE powder | 8.30% |
|   | B-225 stabilizer blend (Ciba) | 0.25% |
| 4 | Pigment White 6 | 62.91% |
|   | Pigment Red 101 | 0.12% |
|   | Pigment Yellow 180 | 0.42% |
|   | Maleated PE Wax (powder) | 24.10% |
|   | 20 MI EMAC pellets (PE Copolymer) | 12.20% |
|   | B-225 stabilizer blend (Ciba) | 0.25% |

Each of the color concentrates were evaluated on a Nissei Model 250 ASB injection-stretch-blow machine fitted with a single cavity. Each of the concentrates were evaluated in polyethylene terephthalate (5122-c) obtained from ICI. In each of the evaluations the results of which appear in Table II, the color concentrate was added to the PET at a level of 3% (or 1 part conc. to 33 parts resin).

TABLE II

Run Conditions and Observations

| Sample | Cycle Time | A °C. | B °C. | C °C. | Back Pressure (PSi) | Observations |
|---|---|---|---|---|---|---|
| 1 | 20 sec | 265 | 265 | 265 | 44 | Good bottles, uniform color, slight screw slippage |
| 2 | 20 sec | 265 | 265 | 265 | 44 to 132 | Good bottles, no screw slippage, color swirls |
| 3 | 20 sec | 265 | 265 | 265 | 44 | Good bottles, uniform color, slight screw slippage |
| 4 | 20 sec | 265 | 265 | 265 | 44 to 132 | Good bottles, no screw slippage, color swirls |
| 4 | 20 sec | 285 | 275 | 265 | 44 | Good bottles, screw slippage, no color swirls |

A = Feed throat zone, B = middle zone, C = nozzle

The food applicable colorant system yielded uniformly colored parts with minimal back pressure (44 psi). This represents an improvement over liquid colorants, which require 132 psi back pressure under similar conditions. Uniformly colored parts were obtained at minimal back pressure with non-food formulations also. However, temperature in the feed and middle zones, the extruder section of the molding machine were raised during the shear melting. Only minimal screw slippage was experienced with the food colorant system and cycle time was not adversely affected, and the screw slippage was essentially equivalent to that observed with liquid colorants.

Testing and evaluation of the inventive colorant system has demonstrated that in most cases, the production of articles of PET is performed according to the same processing conditions whether it is neat, i.e. uncolored, PET or PET processed utilizing the inventive colorant system. In fact, in certain applications, it has been found that a cycle time is actually decreased when the present inventive colorant is utilized is combination with PET blow molding operation.

Thus, it is apparent that there has been provided, in accordance with the invention, a inventive process for manufacture of colored polyethylene terephthalate that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed:

1. A process for preparing a colored polyethylene terephthalate molded compound comprising:

incorporating a colorant system comprised of about 10 to about 30% by weight polyolefin wax, about 10 to about 30% by weight ethylene copolymer selected from the group consisting of ethylene-(meth) acrylic acid, methylacrylate and mixtures thereof, about 0 to about 15% linear low density polyethylene, and about a 1–70% by weight colorant into a melted body of polyethylene terephthalate.

2. The process of claim 1 wherein said colorant also includes a stabilizer.

3. The process of claim 1 wherein said colorant system also includes a filler.

4. The process of claim 1 wherein said colorants are selected from the group consisting of organic and inorganic, dyes compatible with PET.

5. The process of claim 1 wherein said ethylene copolymer has a melt index of between about 0.7 and about 20 gms/10 mins.

6. The process of claim 1 wherein said linear low density polyethylene has a melt index between about 20 and about 100 gms/10 mins.

7. The process of claim 2 wherein said wax dispersant is comprised of maleated wax.

8. The process of claim 1 wherein said wax is selected from the group consisting of (non-maleated waxes).

9. The process of claim 8 wherein said linear low density polyethylene comprises at least about 2% by weight of said composition.

10. A process for preparing a colored polyethylene terephthalate molded compound comprising:

incorporating a colorant comprised of a polyolefin wax, ethylene copolymer, and colorant into a melted body of polyethylene terephthalate.

11. A polyethylene terephthalate article colored with a composition comprised of a polyolefin wax, an ethylene copolymer selected from the group consisting of ethylene-(meth)acrylic acid, methylacrylate and mixtures thereof, and colorant.

12. The article of claim 11 further comprised of a stabilizer.

13. The article of claim 11 further comprised of a filler.

14. The article of claim 11 wherein said colorant is selected from the group consisting of organic and inorganics, dyes compatible with PET.

15. The article of claim 11 wherein said ethylene copolymer is selected from the group consisting of ethylene-(meth) acrylic acid, methylacrylates.

16. The article of claim 15 wherein said ethylene copolymer has a melt index of between about 0.7 and about 20 gms/10 mins.

17. The article of claim 11 further comprised of a linear low density polyethylene having a melt index between about 20 and about 100 gms/10 mins.

18. The article of claim 11 wherein said wax dispersant is comprised of maleated wax.

19. The article of claim 11 wherein said wax is selected from a group consisting of (non-maleated waxes).

20. A process for preparing a translucent polyethylene terephthalate molded article comprising:

incorporating a system comprised of about 10 to about 30% by weight polyolefin wax, about 10 to about 30% by weight ethylene copolymer, and about 2 to about 15% linear low density polyethylene into a melted body of polyethylene terephthalate.

21. The process of claim 1 wherein said colorant system is comprised of at least 50% by weight colorant.

22. The process of claim 1 wherein said colorant system consists essentially of about 10 to about 30% by weight polyolefin wax, about 10 to about 30% by weight ethylene copolymer selected from the group consisting of ethylene-(meth) acrylic acid, methylacrylate and mixtures thereof, about 0 to about 15% linear low density polyethylene, and about a 1–70% by weight colorant into a melted body of polyethylene terephthalate.

* * * * *